UNITED STATES PATENT OFFICE.

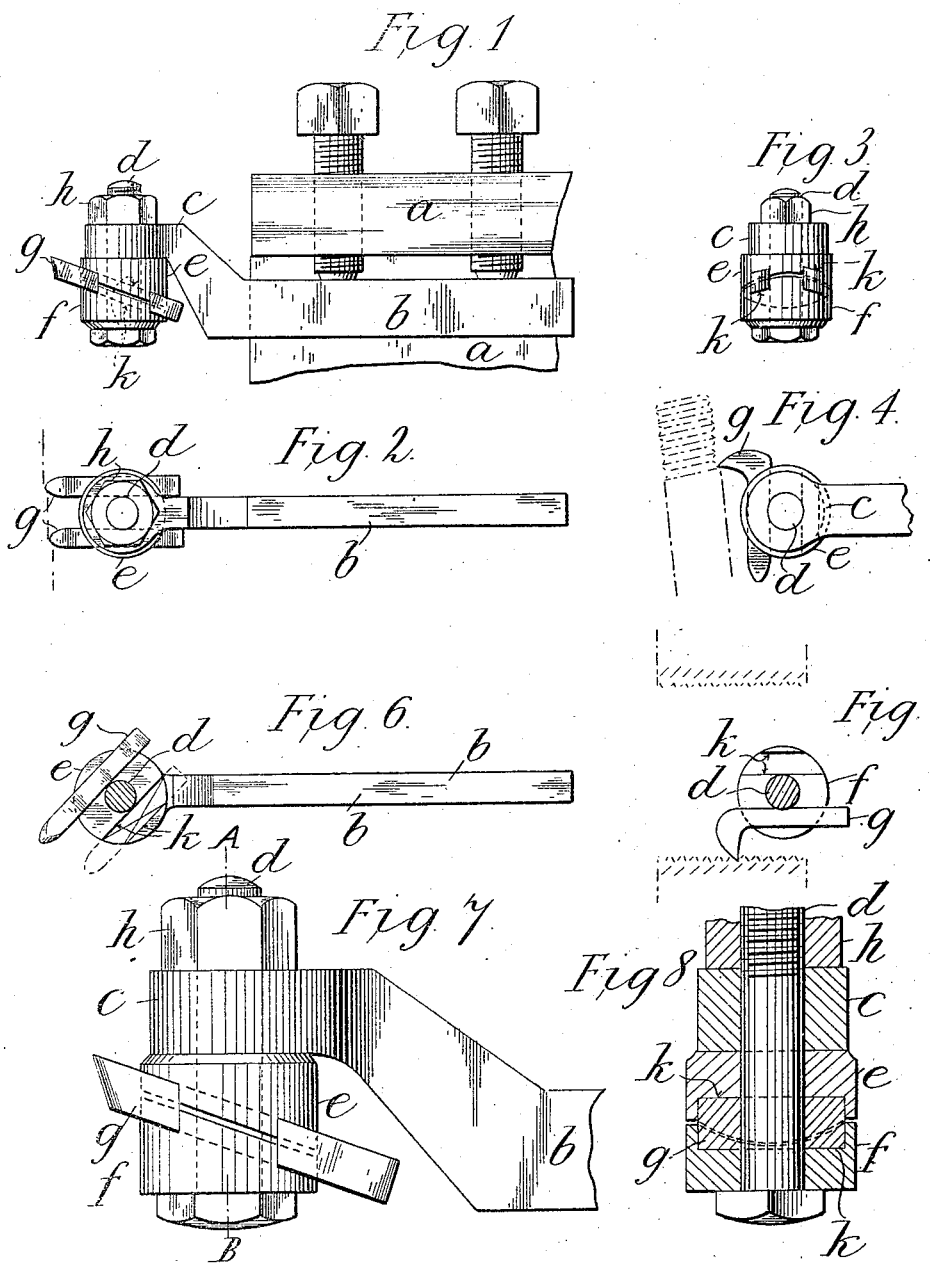

THOMAS O'GARA, OF WEST DERBY, NEAR LIVERPOOL, ENGLAND, ASSIGNOR TO JOHN TIMOTHY D'ARCY HUTTON, OF LIVERPOOL, ENGLAND.

HOLDER FOR ADJUSTABLE TURNING AND THE LIKE TOOLS.

1,245,959. Specification of Letters Patent. Patented Nov. 6, 1917.

Application filed March 7, 1916. Serial No. 82,755.

*To all whom it may concern:*

Be it known that I, THOMAS O'GARA, a subject of the King of Great Britain and Ireland, residing at West Derby, near Liverpool, in the county of Lancaster, England, have invented Improvements in Holders for Adjustable Turning and the like Tools, of which the following is a specification.

This invention relates to holders for adjustable turning and the like tools and the object of the invention is to provide a new or improved construction of holder suitable for carrying one or two small turning or cutting tools preferably made of expensive special steel. The tools are placed in grooves formed therefor in two turret or rotatable washers which are tightly pressed against one end of a tool holder by a centrally arranged gripping bolt. The turret washers can be rotatably adjusted, to suit the work to be done, and no matter what the angular position into which the tool is moved the cutting angle will always remain the same whereas in tool holders of ordinary construction in which the tool passes through an inclined slotted opening in a tightening bolt, the cutting angle is changed and the height of the cutting nose is varied when the holder is angularly adjusted. In the improved holder the tool is supported on a flat bed and not as is usual at three points thus admitting of the expensive steel being economically used up, and minimizing the possibility of it being broken in the gripping arrangement.

Figures 1 and 2 of the accompanying illustrative drawings show in side elevation and plan respectively a tool holder embodying the invention.

Fig. 3 shows the holder in end elevation.

Fig. 4 is a plan illustrating a curved end tool for screw cutting.

Fig. 5 is a similar view to Fig. 4 but showing the turret washer partly rotated through an angle of 180 degrees for cutting internal screw threads, boring or the like.

Fig. 6 is an inverted plan with one turret washer removed showing two parallel grooves for the tools.

Figs. 7 and 8 are views to a larger scale, Fig. 7 being a side elevation of the tool holder and Fig. 8 a vertical section corresponding to the line A, B of Fig. 7.

In Fig. 1, $a$ indicates a portion of a slide rest in which the shank of the improved tool holder $b$ is held.

The free end $c$ of the holder $b$ is kinked as shown and formed with a hole for a vertical gripping bolt $d$ on which are mounted two tapered turret washers $e$ and $f$ adapted by manipulation of the nut $h$ on the bolt $d$, to be tightly forced together and against the end $c$ of the holder, in order to grip firmly tools $g$ placed between the washers $e$ and $f$. The inner faces of the washers $e$, and $f$ are formed with parallel grooves or recesses $k$, $k$ and as shown, the said inner faces are inclined at a suitable angle to set the cutting tool in position with the minimum amount of grinding. The grooves or recesses $k$ $k$ are of rectangular cross section, see Figs. 7 and 8. As the turret washers $e$ and $f$ are rotatable to any angle around the vertical bolt $d$ the height of the cutting edges of the tools $g$ will remain constant with the setting, and the angle of the cutting edge will also remain constant. As the tools are ground down for sharpening, the desired height is maintained by adjusting the tools forwardly through the turret washers.

It will be evident that the tools $g$ being gripped solid between the washers $e$ and $f$ they are not liable to be broken by any bending action of the gripping bolt when tightened and the holder will hold much shorter pieces of expensive steel than other tool holders. The outer end faces of the washers $e$ and $f$ may be serrated if desired so as to prevent them moving out of position relatively to the end $c$ of the holder. The clamping washers with a tool or tools can be adjusted angularly through an angle of 180° without interfering with the cutting angle or altering the height of the tool in relation to the work.

As shown in Fig. 2 two tools may be employed for producing a rough and a finishing cut simultaneously.

When the shank $b$ is made with a more tapered end the center line will be in a direct line with the cutting edge of the tool, although the shank and the tool are slightly adjustable in a vertical direction by setting the cutting tool longitudinally within the turret washers.

It is to be understood that the improved adjustable tool holder may be slightly varied to suit other classes of work such as boring and the like without departure from the invention as set forth in the appended claims.

What I claim is:—

1. In combination, a tool-holding bar, a bolt carried by said bar, and two turret washers arranged on said bolt each having a plurality of parallel grooves therein adapted to receive a pair of tools each passing clear of said bolt and each tool fitting partly in the groove of one washer and partly in the groove of the other washer, whereby one tool may be made to follow the other and each make an independent cut.

2. In combination, a tool-holding bar having an apertured goose-neck shaped end-portion, a fastening bolt passing through said aperture, and two turret washers carried by said bolt having oppositely inclined confronting faces and a plurality of parallel grooves in said faces, the grooves of one washer registering with the grooves of the other washer and each tool fitting partly in the groove of one washer and partly in the groove of the other washer and firmly clamped therebetween by a nut screwed on said bolt.

Signed at Tower Buildings, Water street Liverpool, this fourteenth day of February, 1916.

THOMAS O'GARA.

Witnesses:
F. M. C. Scott,
J. T. D'Arcy Hutton.

Copies of this patent may be obtained for five cents each, by addressing the "Commissioner of Patents, Washington, D. C."